United States Patent [19]

Tufts et al.

[11] Patent Number: 4,582,890

[45] Date of Patent: Apr. 15, 1986

[54] BICYCLIC AMIDE ACETAL/POLYAMINE/POLYISOCYANATE POLYMERS

[75] Inventors: Timothy Tufts, Columbus; Anil Goel, Worthington, both of Ohio

[73] Assignee: Ashland Oil, Inc., Ashland, Ky.

[21] Appl. No.: 730,612

[22] Filed: May 6, 1985

[51] Int. Cl.⁴ ............................................. C08G 18/10
[52] U.S. Cl. ..................................... 528/60; 521/163; 528/64; 528/73
[58] Field of Search ............................ 528/60, 64, 73; 521/163

[56] References Cited

FOREIGN PATENT DOCUMENTS 3235933 3/1984 Fed. Rep. of Germany .

OTHER PUBLICATIONS

Feinauer, *Synthesis*, 1971, pp. 16–26.

Primary Examiner—Maurice J. Welsh
Attorney, Agent, or Firm—John F. Jones

[57] ABSTRACT

A process is described for preparing novel polymers having good impact resistance and other desirable physical properties, said process comprising interpolymerizing a mixture of a bicyclic amide acetal, a polyamine and a polyisocyanate.

18 Claims, No Drawings

BICYCLIC AMIDE ACETAL/POLYAMINE/POLYISOCYANATE POLYMERS

This invention relates to novel polymers which result from the interpolymerization of bicyclic amide acetals, polyamines and polyisocyanates and to a process for preparing them.

The reaction of bicyclic amide acetals with polyisocyanates to produce brittle polymers has been disclosed in West German Patent Publication No. 3,235,933. The preparation of polymers by the interaction of a bicyclic amide acetal, a polyamine and a polyisocyanate has not previously been reported.

We have discovered that polymers having improved physical properties can be produced by the interpolymerization of mixtures of a bicyclic amide acetal, a polyamine and a polyisocyanate.

The preparation of bicyclic amide acetals is more fully described in the copending U.S. patent applications of Anil B. Goel, Ser. No. 641,238 and Anil B. Goel and Harvey J. Richards, Ser. No. 641,242, both filed on Aug. 16, 1984.

Although bicyclic amide acetals have been shown to react with polyisocyanates at elevated temperatures, these reactions are quite slow at room temperature usually taking one-half hour or more for completion. The polymers resulting from such reaction have been found to be quite brittle which detracts from their usefulness. We have discovered that the inclusion of a polyamine in the reaction of a bicyclic amide acetal with a polyisocyanate will increase the reaction rate and produce improved polymeric products. The reaction rate can be conveniently varied by adjustment of the amount and type of polyamine used in our process. The increased rates of our process make it suitable for use in reaction injection molding (RIM) processes, for instance (See U.S. Pat. No. 4,218,543 for a complete description of RIM). In addition to the faster reaction rates achieved in our process, the polymers produced have been found to possess improved quality and physical properties.

The combination of bicyclic amide acetals with polyamines and polyisocyanates gives rapid polymerization even at room temperature in our process. The rate is increased sufficiently that even aliphatic polyisocyanates can be utilized at slightly elevated temperatures and still provide rapid curing with no added catalysts. The process of this invention can be carried out conveniently at a temperature in the range of from about room temperature up to about 200° C.

The bicyclic amide acetals useful in this invention include those having the general Formula I

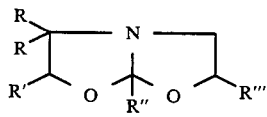

wherein R represents hydrogen or an alkyl group having from 1 to 10 carbon atoms, R' represents hydrogen or an alkyl group having from 1 to 10 carbon atoms, R" represents an alkyl group having from 1 to 20 carbon atoms, an aryl group having from 6 to 12 carbon atoms or an alkaryl group having from 7 to 20 carbon atoms, and R''' represents hydrogen or an alkyl group having from 1 to 20 carbon atoms or an ether group having from 1 to 20 carbon atoms. The bicyclic amide acetals useful in this invention are considered to be at least bifunctional toward isocyanate. The weight ratios of bicyclic amide acetal to polyamine range from 95:5 to 5:95.

Polyamines useful in this invention include those which contain two or more amino groups per molecule wherein at least two amino groups per molecule have at least one hydrogen capable of reaction with isocyanate. Such polyamines include aliphatic, alicyclic, and aromatic types such as ethylene diamine, hexamethylene diamine, isophorone diamine, piperazine, bis(4-amino cyclohexyl) methane, diethylene triamine, diaminobenzenes, diamino toluenes, diethyl toluene diamines methylene dianilines, halogenated methylene dianilines, and the like. Also included are long chain amines such as amine terminated poly(propylene oxide), amine terminated dimer acid derivatives, amine terminated butadiene-acrylonitrile oligomers, and the reaction products of polyamines with oxiranes and the like.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1, 4-diisocyanate, toluene diisocyanate, diphenyl-4, 4-diisocyanate, benzene-1,2,4-triisocyanate, xylene-1,4-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two which are more fully disclosed in U.S. Pat. Nos. 3,350,362 and 3,382,215. Polyisocyanates which are polymeric in nature including isocyanate prepolymers of all types are included in this invention. The equivalent ratio of isocyanate to bicyclic amide acetal and amine may vary from 0.8/1 to about 3/1. If desired, any of the well known polyurethane catalysts may be used in the process of this invention.

Optionally, polyols can be included in the bicyclic amide acetal/polyamine/polyisocyanate mixtures of this invention. Polyols useful for this purpose include those having at least two hydroxyl groups per molecule and having equivalent weights falling in the range of from 20 to 5000. Specific polyols include butane diol, cyclohexane dimethanol, tripropylene glycol, amide diols, urethane diols, polyether polyols such as poly(tetramethylene ether) diols, poly(propylene ether) polyols, polyester polyols, and the like.

Polyhydroxy polyethers useful in this invention are those having at least 2 hydroxyl groups per molecule. Polyhydroxy polyethers can be prepared by polymerization of epoxides, such as ethylene oxide, propylene oxide, butylene oxide, tetrahydrofuran, styrene oxide, or epichlorohydrin either on their own or by chemical addition to other materials such as ethylene glycol, propylene glycol, trimethylol propanes and 4,4'-dihydroxy diphenyl propane and the like. Polybutadienes having hydroxyl groups as well as other known hydroxyl containing vinyl addition polymerized polymers can be used.

The process and polymeric compositions of this invention are further illustrated in the following representative examples.

EXAMPLE 1

This example illustrates the difference in reactivity of the process of the present invention over the prior art bicyclic amide acetal/polyisocyanate reaction. Experiments (A) and (B) of this example are within the scope of this invention and illustrative experiments (C) and (D) are outside the scope of this invention.

(A). A mixture of 4g of a bicyclic amide acetal of Formula I wherein R, R' and R''' are hydrogen and R'' is methyl, 5 g of a triamine of polypropyleneoxide of 5000 molecular weight, 1 g of diethyl toluene diamine and 8.2 g of isophorone diiscyanate was allowed to stand in an open cup and the gelation and curing time was noted. The mixture gelled in 60 minutes and cured to a hard product in less than 24 hours.

(B). The procedure of (A) was followed except that 11 g of liquified 4,4'-methylene bis(phenyl isocyanate) was used in place of the isophorone diisocyanate. In this case the gel time was 1-2 seconds and the cure time to a hard product was about 45 seconds.

(C). A repeat of (A) of this example except that no triamine or diethyl toluene diamine was used and the amount of isocyanate used was 6.6 g gave a mixture which gelled in more than 80 hours and took more than 80 hours for cure to a hard product.

(D) A repeat of (B) of this example except that no amine was used and the amount of isocyanate was 9.3 g resulted in a mixture which gelled in about 20 minutes and formed a hard product in 20 minutes.

EXAMPLES 2-8

The compositions listed in Table I were prepared. The results of testing for heat distortion temperature (HDT) by ASTM D648-56, notched izod impact strength (NII) by ASTM D256 was unnotched izod impact strength (UNI) on the cured compositions are given in Table II. In each case the long chain diamine was pre-reacted by mixing at room temperature with the appropriate isocyanate. This mixture was then degassed at reduced pressure and at room temperature. The bicyclic amide acetal and short chain diamine (if any) were mixed and degassed before mixing all of the components and allowing the curing to take place at 40°-50° C. In Table I the polyamine A is the triamine of a 5000 molecular weight polypropyleneoxide, B is diethyltoluene diamine, E is a 2000 molecular weight amine terminated polypropyleneoxide, F is a 3500 molecular weight amine terminated poly(butadiene- acrylonitrile) and G is bis(4-aminophenyl) methane. Also in Table I the polyisocyanates used are C which is isophorone diisocyanate, D which is liquified 4,4'-bis-(phenyl isocyanate), H which is hydrogenated bis(4-isocyanatophenyl) methane and I which is tetramethyl-p-xylene diisocyanate. In Table II the HDT is at 264 psi and expressed in degrees Centigrade, the NII is expressed in foot pounds per inch of notch and the UNI is expressed in foot pounds.

EXAMPLE 9

A mixture of 40 g of the bicyclic amide acetal described in Example 1 (A), 20 g of a diamine amide based on dimerized linoleic acid, 1 g of diethyltoluene diamine, and 2 g of 5000 molecular weight polypropyleneoxide based triamine was prepared. This mixture was then mixed with 103 g of degassed isophorone diisocyanate. The reaction was immediate at room temperature and a hard, opaque, tough solid resulted after completing the cure at 120 degrees C. for two hours.

EXAMPLE 10

To 200 g of poly(propylene ether) diamine (molecular weight of 400) was added 150 g of 1,2-epoxy 3-phenoxy propane (epoxy eq. wt. of 150) and the mixture was heated at about 110° C. An exothermic reaction took place and the reaction temperature increased to 150° C. After 1 hour the mixture was brought back to room temperature to give a viscous liquid. A portion (18.63 g) of this solution was dissolved in 36.2 g of methyl substituted bicyclic amide acetal (Example 1A), degassed under reduced pressure and mixed with 91 g of degassed polyisocyanate. The polymer sheet obtained by following the procedure of Example 2 showed notched izod impact strength of 0.73 ft.lbs/inch of notch, yield strength of 20,682 psi and flexural modulus of 411,440 psi.

TABLE I

| Components | Example No. | | | | | | |
|---|---|---|---|---|---|---|---|
| | 2 | 3 | 4 | 5 | 6 | 7 | 8 |
| Bicyclic Amide Acetal of Example 1 (A) | 40 g | 40 g | 40 g | 40 g | 40 g | 40 g | 40 g |
| Polyamine A | | | | 22 g | 45 g | | |
| Polyamine B | | | 10 g | | 15 g | | |
| Polyamine E | 30 g | 40 g | 50 g | | | 20 g | |
| Polyamine F | | | | | | | 45 g |
| Polyamine G | | | | | | | 5 g |
| Polyisocyanate C | | | | 72 g | 92 g | | |
| Polyisocyanate D | 102 g | | | | | 101 g | |
| Polyisocyanate H | | 94 g | 111 g | | | | |
| Polysiocyanate I | | | | | | | 89 g |

TABLE II

| Example No. | HDT | NII | UNI |
|---|---|---|---|
| 2 | 65.3 | 1.0 | 12.7 |
| 3 | 113.0 | 1.0 | 6.5 |
| 4 | 121.2 | 1.0 | 9.5 |
| 5 | 134.5 | 0.9 | 11.7 |
| 6 | 147.0 | 0.7 | 2.6 |
| 7 | 83.4 | 0.9 | 3.8 |
| 8 | 143.1 | 0.8 | 1.8 |

EXAMPLE 11

This Example demonstrates that bicyclic amide acetals can be used as reactive compatibilizing agents for aminated polyols and low molecular weight glycols. To an incompatible mixture of 10 g of poly(alkylene ether) diamine (molecular weight 2000) and 2 g of ethylene glycol was added 2 g of the methyl substituted bicyclic amide acetal described in Example 1A. A homogeneous solution resulted which remained miscible for more than 7 days at ambient temperature. This solution reacted with 15.2 g of the diisocyanate described in Example 1B in less than 30 seconds after mixing to give a solid polymer.

EXAMPLE 12

The procedure of Example 9 was followed using 10 g of poly(alkylene ether)diamine of 2000 molecular weight, 2 g of butane diol and 2 g of the bicyclic amide acetal to give a homogeneous solution which remained miscible (no phase separation after 7 days standing at 25° C.). This solution upon mixing with 12.4 g of the diisocyanate described in Example 1B gave a solid polymer within one minute after mixing.

We claim:

1. A process for preparing a polymer having good impact resistance at a rapid rate comprising interpolymerizing a mixture of a bicyclic amide acetal, a polyamine containing two or more amine groups per molecule having at least two amino groups per molecule which have at least one hydrogen capable of reaction with isocyanates and a polyisocyanate wherein the weight ratio of amide acetal to polyamine is in the range of from 95:5 to 5:95 and the equivalent ratio of isocyanate to combined bicyclic amide acetal and polyamine is in the range of from 0.8:1 to about 3:1.

2. The process of claim 1 wherein the bicyclic amide acetal is one having the formula

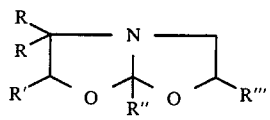

wherein R represents hydrogen or an alkyl group having from 1 to 10 carbon atoms, R' represents hydrogen or an alkyl group having from 1 to 10 carbon atoms, R" represents an alkyl group having from 1 to 20 carbon atoms, an aryl group having from 6 to 12 carbon atoms, or an alkaryl group having from 7 to 20 carbon atoms and R'" represents hydrogen or an alkyl group having from 1 to 20 carbon atoms or an ether group having from 1 to 20 carbon atoms.

3. The process of claim 2 carried out at a temperature in the range of from about room temperature to about 200° C.

4. The process of claim 3 wherein the bicyclic amide acetal is one in which R, R' and R'" are hydrogen and R" is methyl.

5. The process of claim 4 wherein the polyamine is a mixture of triamine of a polypropyleneoxide and diethyl toluene diamine and the polyisocyanate is isophorone diisocyanate.

6. The process of claim 4 wherein the polyamine is a mixture of a triamine of a polypropyleneoxide and diethyl toluene diamine and the polyisocyanate is 4,4'-methylene bis(phenyl isocyanate).

7. The process of claim 4 wherein the polyamine is an amine terminated polypropylene oxide and the polyisocyanate is 4,4'-methylene bis(phenylisocyanate).

8. The process of claim 4 wherein the polyamine is a mixture of an amine terminated polypropyleneoxide and diethyl toluene diamine and the polyisocyanate is hydrogenated bis(4-isocyanato phenyl) methane 9. The process of claim 4 wherein the polyamine is a mixture of an amine terminated amide based on linoleic acid dimer, diethyl toluene diamine and a triamine based on poly propyleneoxide and the polyisocyanate is isophorone diisocyanate.

10. The polymer produced by the process of claim 1.

11. The polymer of claim 10 wherein the bicyclic amide acetal is one having the formula

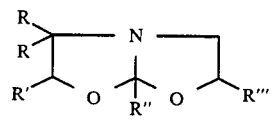

wherein R represents hydrogen or an alkyl group having from 1 to 10 carbon atoms, R' represents hydrogen or an alkyl group having from 1 to 10 carbon atoms, R" represents an alkyl group having from 1 to 20 carbon atoms, an aryl group having from 6 to 12 carbon atoms, or an alkaryl group having from 7 to 20 carbon atoms and R'" represents hydrogen or an alkyl group having from 1 to 20 carbon atoms or an ether group having from 1 to 20 carbon atoms.

12. The polymer of claim 11 produced at a temperature in the range of from about room temperature to about 200° C.

13. The polymer of claim 12 wherein the bicyclic amide acetal is one in which R, R' and R'" are hydrogen and R" is methyl.

14. The polymer of claim 12 wherein the polyamine is a mixture of triamine of a polypropylene oxide and diethyl toluene diamine and the polyisocyanate is isophorone diisocyanate.

15. The polymer of claim 12 wherein the polyamine is a mixture of a triamine of a polypropylene oxide and diethyl toluene diamine and the polyisocyanate is 4,4'-methylene bis(phenyl isocyanate).

16. The polymer of claim 12 wherein the polyamine is an amine terminated polypropylene oxide and the polyisocyanate is a 4,4'-methylene bis(phenylisocyanate).

17. The process of claim 12 wherein the polyamine is a mixture of an amine terminated polypropylene oxide and ocethyl diethyl toluene diamine and the polyisocyanate is hydrogenated bis(4-isocyanato phenyl) methane.

18. The process of claim 12 wherein the polyamine is a mixture of an amine terminated amide based on linoleic acid dimer, diethyl toluene diamine and a triamine based on polypropylene oxide and the polyisocyanate is isophorone diisocyanate.

* * * * *